2,980,705
2,7-DIISOCYANATODIBENZOFURAN AND METHOD OF MAKING IT

John J. Jaruzelski, Pittsburgh, and Wayne E. Smith, Jr., Penn Hills Township, Allegheny County, Pa., assignors to United States Steel Corporation, a corporation of New Jersey No Drawing. Filed Mar. 18, 1960, Ser. No. 15,804

1 Claim. (Cl. 260—346.2)

This invention relates to a novel diisocyanate compound having unexpected useful properties.

Diisocyanates as a group are useful in combination with hydroxyl-containing materials for making urethane foams or spongy masses and protective coatings. Isocyanates react readily with hydroxyl-containing resins to produce solids having a variety of uses. The novel diisocyanate of our invention has low reactivity and solubility with respect to resins and can thus be dispersed therein and stored for a considerable time. Heating of the dispersion causes gelling to give tough elastomers. The low solubility and reactivity are desirable where a delayed reaction is wanted.

The compound of our invention, 2,7-diisocyanatodibenzofuran, may be easily prepared by treating 2,7-diaminodibenzofuran with phosgene. The starting material, 2,7-diaminodibenzofuran, is made by nitration of dibenzofuran with fuming nitric acid in acetic acid, producing 2,7-dinitrodibenzofuran. The latter is hydrogenated in 95% ethanol by the aid of Raney nickel catalyst to produce 2,7-diaminodibenzofuran.

A complete understanding of the invention may be obtained from the following detailed description of a preferred practice thereof.

Anhydrous ethyl acetate (150 ml.) was placed in a 2000-ml., three-necked flask equipped with a sealed mechanical stirrer, gas inlet tube, a reflux condenser connected with a sodium hydroxide trap, and a dropping funnel. The flask was cooled to 0° C., and phosgene was passed into the ethyl acetate for 30 minutes. A slurry of 20 grams (0.101 mole) of 2,7-diaminodibenzofuran in 600 ml. of ethyl acetate was then slowly added to the reaction mixture. When the addition was completed, the mixture was slowly heated to reflux. The almost clear reaction mixture was filtered, and the solvent was removed from the filtrate. The residual solid, 2,7-diisocyanatodibenzofuran was recrystallized from toluene. It melted at 159 to 163° C., and amounted to 21.1 grams (83.5% yield). After a further recrystallization, it melted at 164° C. The composition agreed closely with the theoretical as shown by the following analysis. Calculated for $C_{14}H_6N_2O_3$: C, 67.2%; H, 2.4%; N, 11.2%. Found: C, 67.43%; H, 2.45%; N, 11.21%. The reaction was:

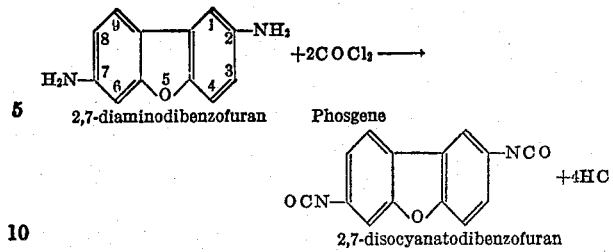

A polycondensate was prepared from adipic acid (1.0 mole), diethylene glycol (1.3 mole), phthalic anhydride (0.2 mole), and glycerine (0.16 mole). This polyester, having a hydroxyl number of 67.3, was compounded with 2,7-diisocyanatodibenzofuran according to the following formulation:

| | Parts |
|---|---|
| Polyester | 16.7 |
| Glycerol | 0.3 |
| Water | 0.1 |
| Silicone (DC–200)[1] | 0.2 |
| Dimethylethanolamine | 0.1 |
| 2,7-diisocyanatodibenzofuran | 5.6 |

[1] ("DC" is a Dow-Corning trademark covering various unctuous organosilicon polymers. In particular, "DC–200" is a polydimethylsiloxane having a viscosity of about 200 centipoises at 60° F.)

The mixture was heated and stirred for 20 minutes at 155° C., then poured into a mold and baked at 155 to 160° C. for one hour. The product obtained was a cellular plastic having the following physical properties:

| | |
|---|---|
| Tensile strength, average | p.s.i. 222 |
| Density | g./cc. .51 |
| Ultimate elongation | percent 90 |
| Shore hardness, average (skin) | 71 |

The material is suitable for use in insulation, crash padding and the like.

The commercially available hydroxypolyether, "Niax" Triol, a copolymer of hexanetriol and propylene oxide, having a hydroxyl equivalent of 520, was compounded with 2,7-diisocyanatodibenzofuran according to the following formulation:

| | Parts |
|---|---|
| "Niax" Triol | 5.2 |
| Glycerol | 0.1 |
| 2,7-diisocyanatodibenzofuran | 0.8 |

The mixture was heated for 20 minutes at 120 to 160° C. and gave a rubber-like product with good adhesive properties. The product is useful for bonding of aluminum foil, metals and wood.

It will be evident from the foregoing that our new compound has substantial utility and that it may be easily made.

Although we have disclosed herein the preferred embodiment of our invention, we intend to cover as well any change or modification therein which may be made without departing from the spirit and scope of the invention.

We claim:

As a new manufacture, the chemical compound 2,7-diisocyanatodibenzofuran having the formula:

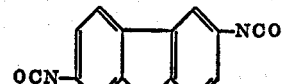

No references cited.

UNITED STATES PATENT OFFICE
CERTIFICATION OF CORRECTION

Patent No. 2,980,705 April 18, 1961

John J. Jaruzelski et al.

It is hereby certified that error appears in the above numbered patent requiring correction and that the said Letters Patent should read as corrected below.

Column 2, for the designation "+4HC", at end of right-hand structure in reaction, read --- +4HCl ---.

Signed and sealed this 5th day of September 1961.

(SEAL)
Attest:

ERNEST W. SWIDER
Attesting Officer

DAVID L. LADD
Commissioner of Patents